Nov. 1, 1927. 1,647,838

A. MOORHOUSE

MOTOR VEHICLE

Filed Sept. 9, 1925

Inventor
Alfred Moorhouse
By Milton Sibbetts
Attorney

Patented Nov. 1, 1927.

1,647,838

UNITED STATES PATENT OFFICE.

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed September 9, 1925. Serial No. 55,346.

This invention relates to motor vehicles and more particularly to the bumpers in common use on such vehicles for protection against collision.

Such bumpers are usually supported on brackets attached to the frame of the vehicle at the front and rear ends thereof, the bumpers extending transversely of the vehicle. It has been found that considerable damage has been done to the bodies of vehicles equipped with such bumpers, by stones and other such objects in the road, which are thrown by the vehicle wheels against the bumpers from which they are deflected and strike the body. This mars the paint and dents the body panels, taking place with particular frequency at the rear of the vehicle.

One of the objects of this invention is to provide means to prevent stones thrown by the rear wheels of a motor vehicle from being deflected by the bumper into the rear panels of the vehicle body.

Another object of the invention is to provide a shield or deflector on the rear bumper of the motor vehicle, which shall protect the body of the vehicle from objects thrown from the road by the vehicle wheels.

Another object of the invention is to provide apparatus of the character designated, which shall be simple, strong, free from rattles, and easily manufactured and installed.

Other objects of the invention will appear from the following description taken in connection with the drawings, which form a part of this specification, and in which.

Figure 1:
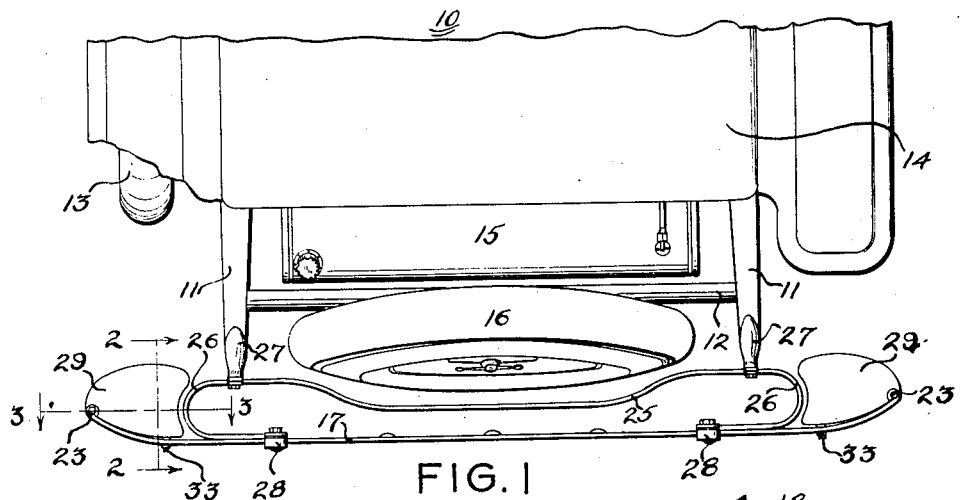
Fig. 1 is a plan view partially broken away of the rear portion of a motor vehicle, showing the application of the invention thereto.

Referring to the drawings, at 10 is shown the rear portion of a motor vehicle having a frame including side members 11 and cross members 12 mounted in the usual manner upon wheels 13 and adapted to support a body 14. The frame is adapted to carry at its rear end a fuel tank 15 and a spare wheel and tire 16 in the customary manner, and the rear ends of the frame members 11 are arranged to support a bumper 17 to protect the vehicle against damage by collision. The bumper 17 may be of any suitable construction, but as shown, it consists of spaced parallel impact members 18 and 19 arranged one above the other and formed at their ends with eyes 21 and 22 respectively, through which bolts 23 are passed. The bolts 23 also pass through spacing members or sleeves 24 arranged between the eyes. The bars 18 and 19 may also be connected intermediate their ends by suitable clamps, if desired. The bars are preferably secured to the vehicle frame by a spring 25 having looped portions 26, which are secured to suitable supporting lugs 27, on the side members 11. The spring member may be secured to the impact bars in any convenient manner as by clamps 28.

The ends of the bars 18 and 19 project transversely of the vehicle into and beyond the vertical plane of the wheels 13 to more adequately protect the fenders or mud guards from injury. These projecting ends are frequently struck by small stones and other objects, which are thrown upwardly and rearwardly by the vehicle wheels 13, and which are deflected from the bumper 17 and strike the rear panels of the body 14 and injure the finish thereof. To prevent this, a shield or deflector 29 is secured to the outer end of the bumper 17 at each end thereof, which deflectors are arranged in the horizontal plane of the bumper below the level of the vehicle body and in the vertical plane of the wheels 13, so that any stones or other objects thrown upwardly by the wheels will strike the deflectors, which will prevent them from glancing against the vehicle body.

Figure 2:
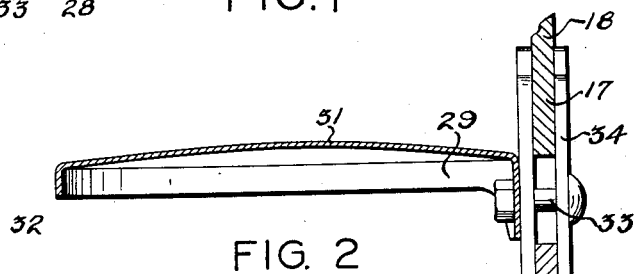
Fig. 2 is a detailed sectional view substantially on the line 2—2 of Fig. 1.
Figure 3:
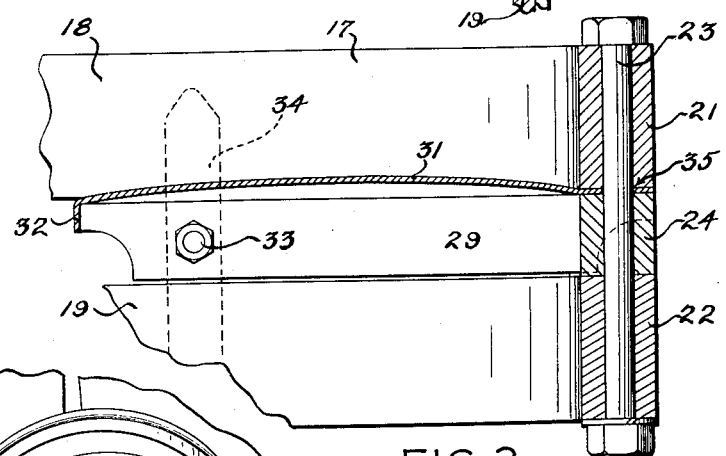
Fig. 3 is a view partially in elevation and partially in section on the line 3—3 of Fig. 2.
Figure 4:
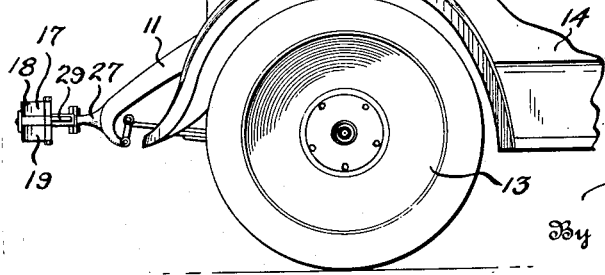
Fig. 4 is a side elevation of the rear portion of a motor vehicle, drawn to a smaller scale, and showing the relative position of the vehicle and its frame, its fenders, its bumpers and the body.

Each of the deflectors 29 preferably consists of a stamped plate 31 having a curved outline in plan, which may conveniently conform to the curve of the outer end of the bumper bars, and which may be slightly crowned, if desired, as clearly indicated in Figs. 2 and 3. The deflector plate 31 is also provided with a depending peripheral flange 32, secured to the bars 18 and 19 at one or more points on its perimeter in any convenient manner, as by bolts 33 and clamp plates 34. The flange 32 is preferably cut away adjacent the spacer member 24 and the edge of the plate 31 is secured between this member 24 and the eye 21 of the bumper bar 18. This portion of the deflector is provided with a suitable hole 35 through which the bolt 23 passes so that it is rigidly secured to the bumper bars, and is consequently free from vibration and rattles.

The operation of this device will be apparent from the above description. The simplicity and strength of this device will be apparent as will also the inexpensiveness of its manufacture and the ease of its application.

It will be understood that various forms of the invention other than those described above may be used without departing from the spirit or scope of the invention.

What is claimed is:

1. The combination with a motor vehicle having wheels and a frame, of a bumper having impact bars secured to the frame transversely of the vehicle at one end thereof, and horizontally disposed deflector shields secured to said bars at each end thereof.

2. The combination with a motor vehicle having wheels and a frame, of a bumper having impact bars secured to the frame transversely of the vehicle at one end thereof, and horizontally disposed deflector shields secured to said bars in line with said wheels.

3. The combination with a motor vehicle having wheels, a frame and a body on said frame, of a bumper having impact members secured to the frame at one end thereof, and deflectors secured to said members below the plane of the body and disposed horizontally in the vertical plane of the wheels.

4. The combination with a motor vehicle having wheels, a frame and a body on said frame, of a bumper having spaced impact members secured to the frame and joined at each end by a bolt, and a deflector clamped to said members by said bolt and arranged in the vertical plane of the wheels.

5. The combination with a motor vehicle having wheels and a frame, of a bumper having impact members secured to the frame, a deflector having a substantially horizontal portion and a depending flange thereon, means including a bolt to secure said deflector between said members and in the vertical plane of the wheels, and means clamping said flange to said members.

6. The combination with a motor vehicle having wheels, a frame, and a body, of means supported from said frame, said means horizontally disposed in the vertical planes of the wheels and back of the wheels to prevent injury to said body by stones thrown from said wheels.

In testimony whereof I affix my signature.

ALFRED MOORHOUSE.